United States Patent [19]

Tarusawa et al.

[11] Patent Number: 4,552,179
[45] Date of Patent: Nov. 12, 1985

[54] MINIATURE SOLENOID VALVE

[75] Inventors: Tetsunobu Tarusawa; Shoiti Kawada; Ryosuke Senzai, all of Aichi, Japan

[73] Assignee: CKD Corporation, Komaki, Japan

[21] Appl. No.: 585,344

[22] Filed: Feb. 29, 1984

[30] Foreign Application Priority Data

Aug. 25, 1983 [JP] Japan .................. 58-131329[U]
Sep. 1, 1983 [JP] Japan .................. 58-135679[U]

[51] Int. Cl.[4] ............... F15B 13/044; F16K 31/06
[52] U.S. Cl. ........................ 137/625.65; 251/129.15
[58] Field of Search ................ 137/625.65; 251/129

[56] References Cited

U.S. PATENT DOCUMENTS 3,908,700 9/1975 Debaye .................... 137/625.65
4,102,526 7/1978 Hargraves ............... 137/625.65 X
4,238,110 12/1980 McCabe ..................... 251/129

FOREIGN PATENT DOCUMENTS 2540751 4/1976 Fed. Rep. of Germany ............ 137/625.65

Primary Examiner—Gerald A. Michalsky
Attorney, Agent, or Firm—Wenderoth, Lind & Ponack

[57] ABSTRACT

In a miniature solenoid valve having a valve casing with a valve chest and a plurality of flow passages in communication with said valve chest formed therein; a valve body movably received in said valve chest for controlling the communication between the valve chest and said passages; and a solenoid provided adjacent to said casing for moving said valve body by means of a plunger, the casing is formed with an opening in communication with the valve chest, the solenoid is removably received at one end of the solenoid in the opening and the valve casing and the solenoid are secured together by means of fixing means including fixing pins passing through the casing and solenoid.

23 Claims, 13 Drawing Figures

和4,552,179

MINIATURE SOLENOID VALVE

BACKGROUND OF THE INVENTION

This invention relates to a miniature solenoid valve in which one end of a solenoid acting as the drive means for the valve is removably received in a receiving opening formed in a valve casing and the solenoid and valve casing are integrally assembled together by means of releasable fixing or holding means whereby the solenoid valve can be easily overhauled.

As one of prior art practical miniature electromagnetic valves or solenoid valves, the solenoid valve as disclosed in Japanese Patent Application No. 110990/1975, for example, can be considered. Although the prior art solenoid valve is an epoch-making and satisfactory device so far as the valve realizes reduction in size, since the valve casing and solenoid in the valve are integrally secured together by caulking the components against each other or the like means, the valve frequently tends to malfunction due to foreign matters entrapped within the valve and presents problems in overhauling when such a malfunction occurs.

SUMMARY OF THE INVENTION

Therefore, one object of the present invention is to provide a miniature solenoid valve which can be simply overhauled without the sacrifice of reduction in overall size.

Another object of the present invention is to provide a miniature solenoid valve which is simpler in construction and in which the valve casing and solenoid are detachably connected together by means of simply operable fixing means whereby the valve can be simply overhauled.

The above and other objects of the present invention can be attained by the construction in which the valve casing is formed on one face thereof with a receiving opening, the solenoid is removably received at one end in the opening and the valve casing and solenoid are held in the assembled position by means of fixing means passing through the components.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

DETAILED DESCRIPTION OF THE PREFERRED EMBODIMENTS

Figure 1:
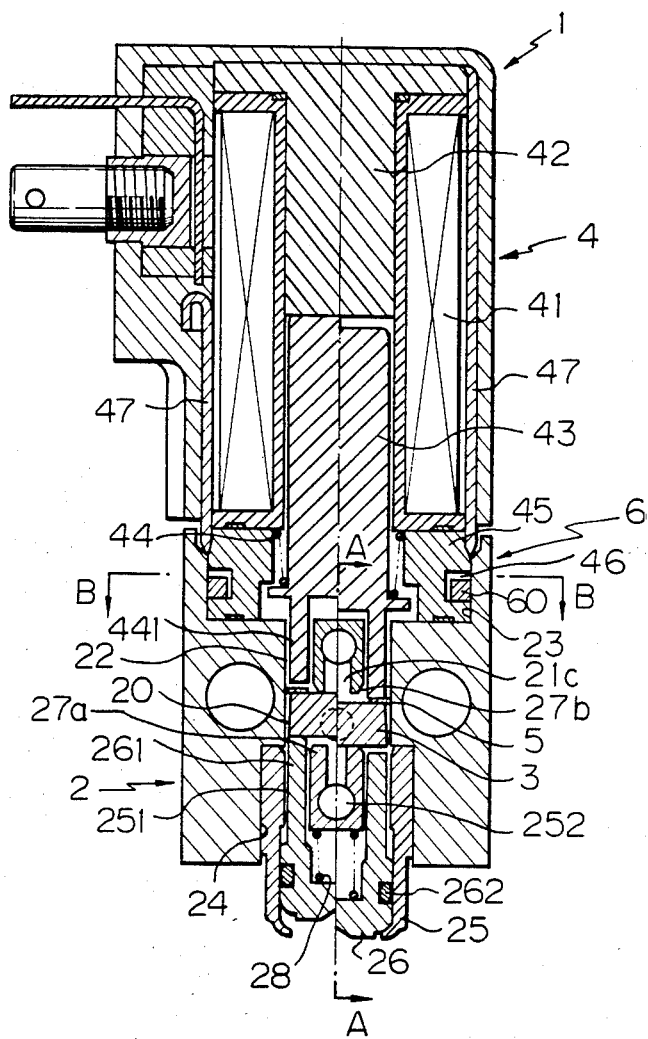
FIG. 1 is a vertically sectional view of a first embodiment of the miniature solenoid valve constructed in accordance with the principle of the present invention, wherein a plunger and a valve body in left hand half and those right hand half are shown in different position.
Figure 2:
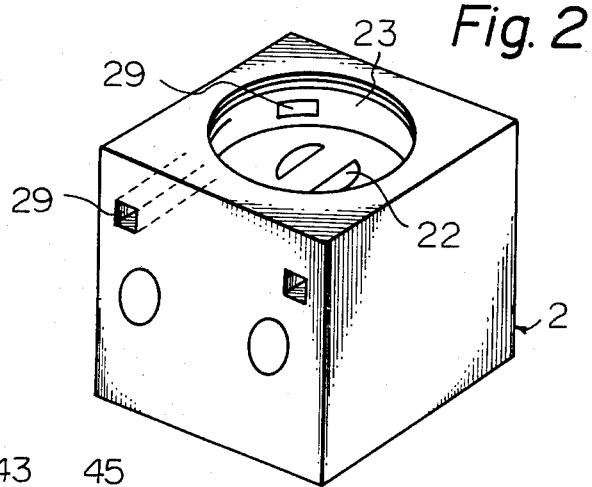
FIG. 2 is a perspective view of the valve casing of said miniature solenoid valve as shown in FIG. 1.
Figure 3:
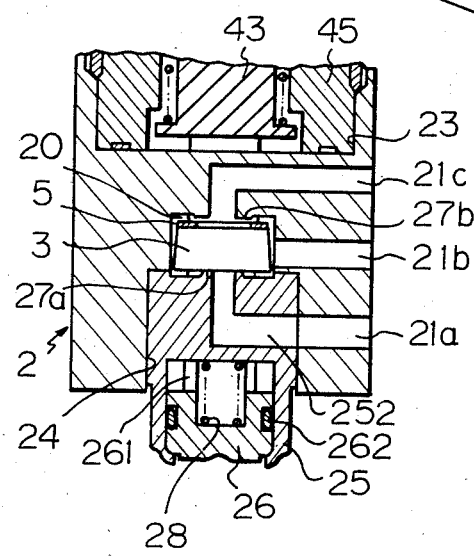
FIG. 3 is a fragmentary vertically sectional view of a portion of said solenoid valve as shown in FIG. 1 taken along the line A—A therein.

Referring to the accompanying drawings and more particularly, to FIGS. 1 through 6, the first embodiment of the miniature solenoid valve of the invention is generally shown by reference numeral 1. The miniature solenoid valve 1 generally comprises a valve casing 2 in which a valve chest or chamber 20 and a plurality of fluid passages or ports 21 (21a–21c) in communication with the valve chest 20 are formed; a valve body 3 in the form of a resilient member movably received within the valve chest 20; a solenoid 4 acting as drive means for the valve body 3; and holding or fixing means 6 for holding the valve casing and solenoid in position.

The valve casing 2 is formed with a larger diameter opening or recess 23 open on the top of the casing and in communication with the valve chest 20 through a pair of apertures 22. The casing 2 is further formed with an opening 24 in which a valve seat member 25 is fitted and held in position and a pusher member 26 is movably received within the valve seat member 25. The opening 24 has the diameter greater than that of the valve chest 20, but smaller than that of the recess 23. The upper end of the bifurcated portion 261 of the pusher member 26 is adapted to extend through a pair of apertures 251 in the valve seat member 25 into the valve chest or chamber 20. The upper end of the valve seat member 25 faces the valve chest 20 and is formed with an annular valve seat 27a and an annular valve seat 27b is formed in an upper portion of the valve chest 20. As more clearly shown in FIG. 3, the ports 21a, 21b, 21c are formed in the casing 2 in vertically spaced relationship and each opens at one end on the same side face of the casing 2. The port 21a communicates at the other end with one end of a through hole 252 formed in the valve seat member 25 and the other end of the through hole 252 opens to the bottom of the valve chest 20 on one side of the valve seat 27a. The port 21b opens at the other end to the side wall of the valve chest 20. The port 21c opens at the other end to the top wall of the valve chest 20 on the inner side of the valve seat 27c. The pusher member 26 is normally biased downwardly under the force of a spring 28 interposed between the member 26 and valve seat member 25. Reference numeral 262 denotes a seal member adapted to prevent of leakage of fluid between the valve seat member 25 and pusher member 26.

The solenoid 4 comprises a cylindrically wound coil 41, a stator core 42 fitted in and held in position at the upper end of the coil 41, a movable core or plunger 43 movably received in the lower end portion of the coil and a spring 44 normally biasing the movable core 43 downwardly.

The solenoid 4 has on one end thereof (the lower end as seen in FIG. 1) an extension ring 45 (referred to simply as "ring" hereinafter) secured thereto as one part of the stator core 42. The ring 45 is formed of magnetic material similar to that of which the stator core 42 is formed. That is, the stator core 42 and ring 45 are magnetically connected together by means of a frame 47 formed of magnetic material and surrounding the outer periphery of the coil 41 whereby the ring 45 acts as one part of the stator core 43.

The inner peripheral surface of the extension ring (stationary iron core) faces the movable core or plunger 42 and return spring 44 leaving a minimum clearance left about the outer periphery of the movable core and the length L of the extension of the stator core or the extension ring is substantial so as to reduce the magnetic resistance of the stator core.

A pair of parallel grooves 46 are formed in diametrically opposite positions on the outer periphery of the ring 45 in a direction substantially right angles to the axis of the ring.

The movable core 43 is bifurcated at the lower end to form branched portions 441 which project through the apertures 22 in the casing 2 into the valve chest 20 whereby the movable iron core 43 urges the washer 5 and valve body or valve member 3 downwardly (towards the valve seat 27a).

A pair of pin receiving holes 29 are formed in an upper portion of the casing 2 which are adapted to linearly align with the grooves 46 in the ring 45 when the ring 45 is properly positioned within the recess 23.

Figure 6:
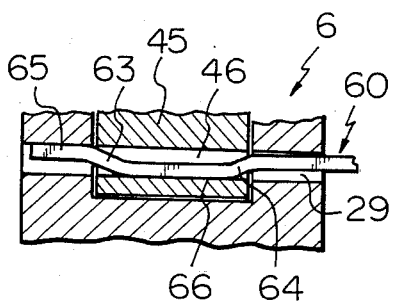
FIG. 6 is a cross sectional view taken along the line C—C of FIG. 4 showing the disposition of the fixing means.

As more clearly shown in FIG. 6, substantially barlike holding or fixing pins 60 extend through the respectively aligned holes 29 and grooves 46 to hold the solenoid 4 against slipping or coming out of the recess 23. The holding or fixing pins 60, holes 29 and grooves 46 cooperate with each other to form holding or fixing means 6.

As more clearly shown in FIG. 6, the fixing pin 60 is bent at two points 63, 64 to present a convexed or concaved configuration. When the fixing pin 60 is inserted into the associated hole 29 in the casing and the associated groove 46 in the ring 45, the upper surface 65 of the pin 60 at the opposite ends thereof contacts the upper wall of the hole 29 and the undersurface 66 of the pin at the central area thereof contacts the lower wall of the hole 29 to resiliently hold the ring within the recess 23 whereby the casing and solenoid are held in position. The fixing pin 60 has a square cross section. When the solenoid 4 is desired to be removed from the valve casing 2 for repair and/or disassembly of the solenoid valve, the ends of the fixing pins 60 projecting out of the casing 2 are gripped to pull the fixing pins out of the holes 29 and the solenoid 4 is then pulled out of the casing 2.

In the embodiment of the solenoid valve as shown in FIGS. 1 through 6, assuming that the port 21a is designed as the inlet port, the port 21b is designed as the outlet port and the port 21c is designed as the discharge port, respectively, when the coil 41 is in its deenergized condition, since the valve body 3 is biased downwardly by the action of the movable core 43 to engage the valve seat 27a as shown in right hand half of FIG. 1, no fluid flows out of the outlet port 21b.

When the coil 41 is then energized to attract the movable core 43 towards the stationary iron core 42, since the movable iron core 43 does not act on the valve body 3 to push the latter downwardly, the valve body 3 is urged against the valve seat 27b under the pressure of the fluid from the port 21a as shown in left hand half of FIG. 1 and the fluid from the port 21a flows out of the port 21b as the outlet port.

In the manual operation of the solenoid valve 1, when the pusher member 26 is pushed up by hand at the lower end thereof, the valve body 3 is pushed up by the pusher member 26 to contact the valve seat 27b whereby the ports 21a and 21b are communicated with each other.

Figure 5:
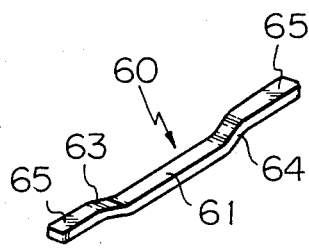
FIG. 5 is a perspective view of the fixing pin.
Figure 7:
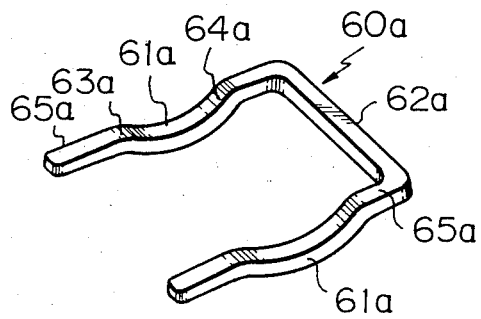
FIG. 7 is a perspective view of a modified fixing pin.

FIG. 7 shows a modified holding or fixing means. The modified holding or fixing pin 60a comprises two leg portions 61a substantially similar to the fixing pin 60 as shown in FIG. 5 and an arm 62a integrally connecting the leg portions together at one end thereof to provide a U-shape configuration whereby the fixing pin can be attached to and detached from the valve casing rapidly and automatically.

In the embodiment of the fixing pin 60a as shown in FIG. 7, the leg portions 61a may be of circular cross section instead of square cross section.

Figure 8:
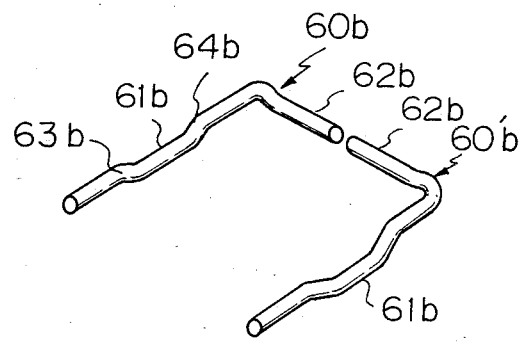
FIG. 8 is a perspective view of a further modified fixing pins.
Figure 9:
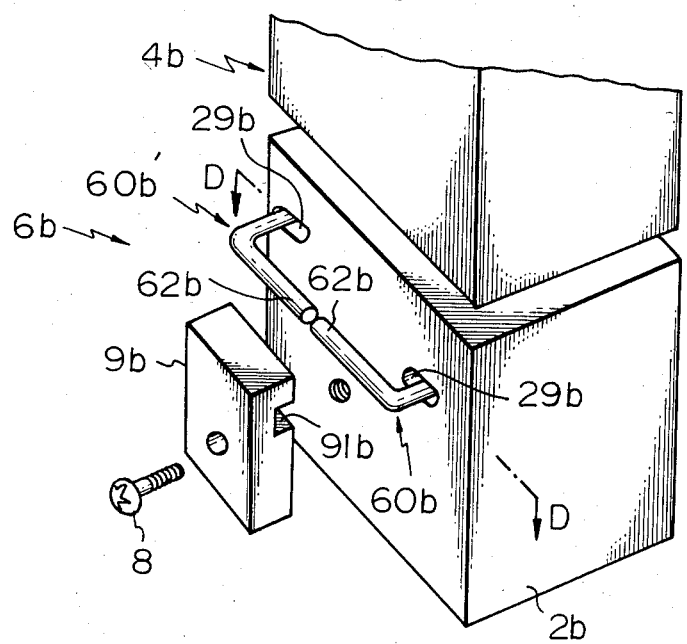
FIG. 9 is a fragmentary perspective view of a portion of another embodiment of the miniature solenoid valve constructed in accordance with the principle of the present invention showing fixing means in which said fixing pins as shown in FIG. 8 is employed.
Figure 10:
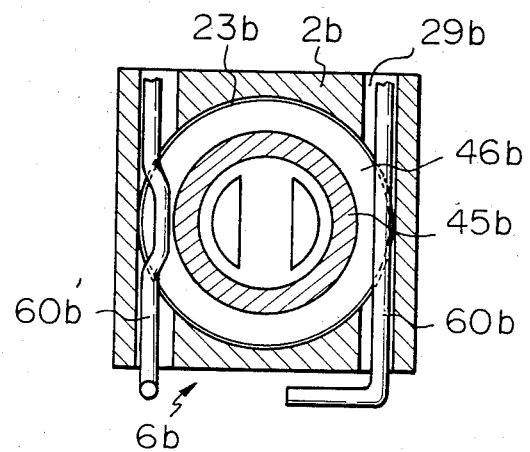
FIG. 10 is a cross sectional view taken along the line D—D of FIG. 9 showing the fixing pins of said fixing means of FIG. 9 in different dispositions.

FIGS. 8 through 10 show another embodiment of the miniature solenoid valve employing modified holding or fixing means having fixing pins 60b. In this embodiment, the pin receiving holes 29b in the valve casing 2b are formed wider (the dimension in the horizon is greater than that in the vertical) than the corresponding holes in the preceding embodiment of the valve or as having a substantially elliptic configuration as seen in the horizon and the groove 46b in the outer periphery of the ring 45b associated with the solenoid 4 (not shown) is formed as an annular groove having a deeper depth than that of the corresponding grooves 46 in the preceding embodiment of the valve in order to conform with the dimension of the holes 29b in the horizon. Furthermore, the fixing means comprises a pair of oppositely directed fixing pins 60b, 60b' each formed as having a substantially L-shape which includes a main or first portion 61b and a second or end portion 62b integrally formed with and extending from the portion 61b at substantially right angles thereto. That is, the second portion 62b is bent substantially right angles to the portions 63b, 64b of the first portion 61b. In each of the pins 60b, 60b', the central area between the portions 63b, 64b is so bent with respect to the portions that when the second portions 62b, 62b of the two fixing pins 60b, 60b' are faced each other at their free ends as shown in FIG. 8, the central areas of the portions 63b, 64b project downwardly with respect the rest of the pins.

When the fixing pins 60b, 60b' are to be mounted in the associated pin receiving holes 29b, 29b, first of all, the pins are inserted into the associated holes 29b, 29b to predetermined positions therein with the central bent areas between the portions 63b, 64b facing sideways (and accordingly, the portions 62b facing upwardly), the pins 60b, 60b' are then turned by 90° to align the portions 62b, 62b of the pins 60b, 60b' with each other in end-to-end relationship as shown in FIGS. 8 and 9, and thereafter, a retainer 9b is secured to the casing 2 by means of a set screw 8 to receive the portions 62b, 62b of the pins 60b, 60b' in the groove 91b in the retainer 9b. In this way, the first portions 61b, 61b of the pins 60b, 60b' are held in position within the associated guide or receiving holes 29b and groove 46b in the same condition as that in which the corresponding single fixing pin is held as shown in FIG. 6 so that the spring action of the fixing pins firmly hold the solenoid 4 in the valve casing. The fixing pins 60b, 60b' preferably have a circular cross section.

Figure 4:
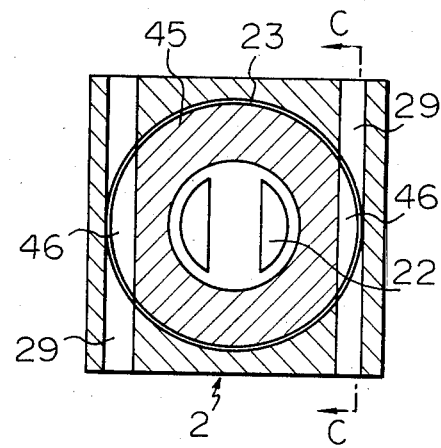
FIG. 4 is a cross sectional view taken along the line B—B of FIG. 1 showing said solenoid valve with the fixing pins and movable iron core removed therefrom.

In the embodiment of FIGS. 1 through 6, although the ring 45 is formed with a pair of parallel grooves 46, the grooves may be replaced by the single annular groove 46b as shown in FIG. 10. And in the embodiment of FIGS. 8 through 10, alternately, the single annular groove in the ring 45b may be replaced by the pair of parallel grooves as shown in FIG. 4. Furthermore, the ring 45 or 45b may be formed with a plural pairs of parallel grooves to form polygonal cross-section.

Figure 11:
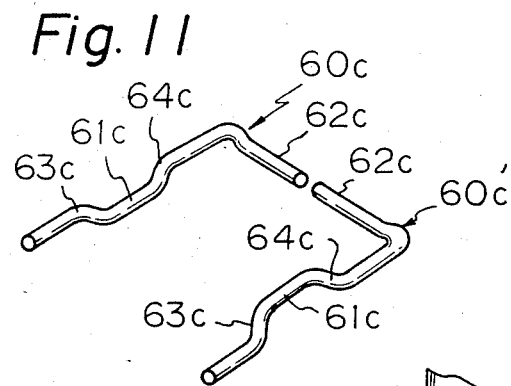
FIG. 11 is a perspective view of a further modified fixing pins.
Figure 12:
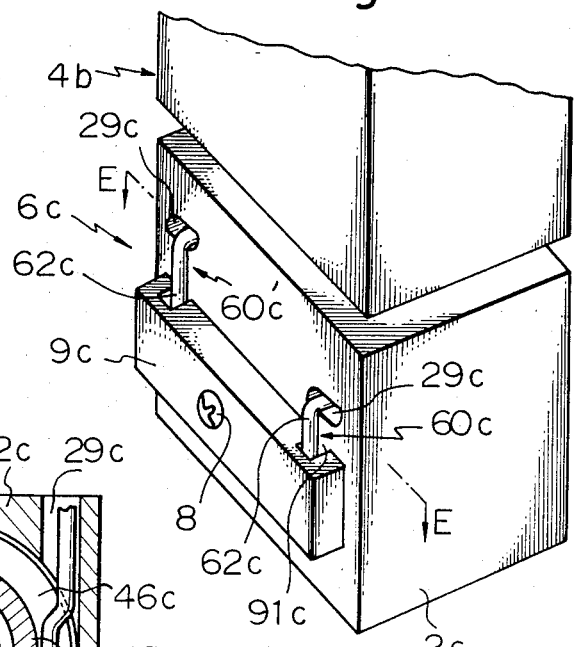
FIG. 12 is a fragmentary perspective view of a portion of another embodiment of the miniature solenoid valve constructed in accordance with the principle of the present invention showing fixing means in which said fixing pins as shown in FIG. 11 is employed.
Figure 13:
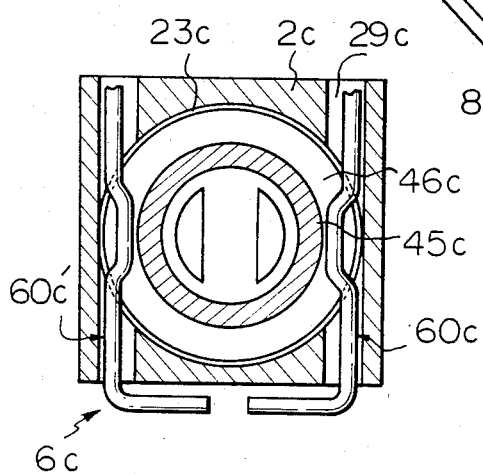
FIG. 13 is a cross sectional view taken along the line E—E of FIG. 12 showing fixing pins inserted in holes in the casing.

FIGS. 11 through 13 show a further modified holding or fixing means. In the modified fixing means of FIGS. 11 through 13, the holding or fixing pins 60c, 60c' are substantially similar to the fixing pins 60b, 60b' in the embodiment of FIGS. 8 through 10 except that the central area between the portions 63c, 64c of the first or main portion in each pin is bent or projects in the same direction as the associated second or end portion 62c of the same pin.

When the fixing pins 60c, 60c' are to be inserted into the associated holes 29c in the valve casing 2c, first of all, the pins are inserted into the holes with the free ends of the second portions 62c, 62c thereof facing each other in linear alignment to predetermined positions therein and the pins are then rotated by 90° to face the central areas 61c, 61c downwardly and push the solenoid against the casing firmly. Thereafter, the retainer holder 9c is secured to the casing 2c by means of the set screw 8 to hold the pins in that position and prevent the pins from coming out of the hole 29c.

The central areas of the first portions 61c, 61c may be extend or projected in the direction opposite to the extending direction of the second portions 62c, 62c as desired.

According to the miniature solenoid valve of the present invention, the casing and solenoid can be easily assembled and disassembled by merely inserting the fixing pin or pins into and pulling the pin or pins out of the associated hole or holes and thus, the solenoid valve has the advantage that the valve can be easily overhauled. The solenoid valve further has the advantage that the mounting angle of the solenoid and casing can be varied as desired when the groove is formed as an annular configuration.

While preferred embodiments of the invention have been shown and described in detail, it will be understood that they are for illustration purpose only and not to be taken as a definition of the invention, reference being had for this purpose to the appended claims.

What is claimed is:

1. A miniature solenoid valve comprising a valve casing having a valve chest and a plurality of flow passages in communication with said valve chest formed therein; a valve body movably received in said valve chest for controlling the communication between the valve chest and said passages; and a solenoid provided adjacent to said casing for moving said valve body by means of a plunger, said valve being characterized in that said casing is formed with an opening in communication with said valve chest, said solenoid is removably received at one end of the casing in said opening and said valve casing and said solenoid are secured together by means of fixing means including fixing pins passing through the casing and solenoid.

2. The miniature solenoid valve as set forth in claim 1, in which said fixing means further includes groove means formed in the outer periphery of said solenoid at one end of the solenoid and hole means adapted to be aligned with said groove means formed in the valve casing.

3. The miniature solenoid valve as set forth in claim 2, in which said hole means formed in said valve casing comprises two parallel holes.

4. The miniature solenoid valve as set forth in claim 3, in which said groove means comprises at least one pair of parallel grooves formed in the outer periphery of said solenoid at one end of the solenoid.

5. The miniature solenoid valve as set forth in any one of claims 2 to 4, in which said grooves means is formed in a ring secured to the coil of said solenoid at one end of the solenoid.

6. The miniature solenoid valve as set forth in claim 5 in which said fixing pin comprises a bar-like member having a convexly bent portion at substantially the central area of said bar-like member.

7. The miniature solenoid valve set forth in claim 6 in which said fixing pin has a pair of substantially parallel legs portions each having a convexly bent area in the center of the member and an arm portion connecting between said parallel legs.

8. The miniature solenoid valve as set forth in claim 5 in which said fixing pin comprises a bar-like member having a concavely bent portion at substantially the central area of said bar-like member.

9. The miniature solenoid valve as set forth in claim 5 in which said fixing pin has a pair of substantially parallel legs portions each having a concavely bent area in the center of the member and an arm portion connecting between said parallel legs.

10. The miniature solenoid valve as set forth in any one of claims 1 to 4, in which said fixing pin comprises a bar-like member having a convexly bent portion at substantially the central area of said bar-like member.

11. The miniature solenoid valve as set forth in claim 10 in which said fixing pin has a pair of substantially parallel legs portions each having a convexly bent area in the center of the member and an arm portion connecting between said parallel legs.

12. The miniature solenoid valve as set forth in claim 10 in which said fixing pin has a pair of substantially parallel legs portions each having a concavely bent area in the center of the member and an arm portion connecting between said parallel legs.

13. The miniature solenoid valve as set forth in any one of claims 1 to 4, in which said fixing pin has a pair of substantially parallel legs portions each having a convexly bent area in the center of the member and an arm portion connecting between said parallel legs.

14. The miniature solenoid valve as set forth in any one of claims 1 to 4, in which said fixing pin comprises a bar-like member having a concavely bent portion at substantially the central area of said bar-like member.

15. The miniature solenoid valve as set forth in any one of claims 1 to 4, in which said fixing pin has a pair of substantially parallel legs portions each having a concavely bent area in the center of the member and an arm portion connecting between said parallel legs.

16. The miniature solenoid valve as set forth in claim 2 or 3, in which said groove means is an annular groove formed in the outer periphery of said solenoid at one end of the solenoid.

17. The miniature solenoid valve as set forth in claim 16 in which said grooves means is formed in a ring secured to the coil of said solenoid at one end of the solenoid.

18. The miniature solenoid valve as set forth in claim 17 in which said fixing pin has a pair of substantially parallel legs portions each having a convexly bent area in the center of the member and an arm portion connecting between said parallel legs.

19. The miniature solenoid valve as set forth in claim 17 in which said fixing pin has a pair of substantially parallel legs portions each having a concavely bent area in the center of the member and an arm portion connecting between said parallel legs.

20. The miniature solenoid valve as set forth in claim 16 in which said fixing pin comprises a bar-like member having a convexly bent portion at substantially the central area of said bar-like member.

21. The miniature solenoid valve as set forth in claim 16 in which said fixing pin has a pair of substantially parallel legs portions each having a convexly bent area in the center of the member and an arm portion connecting between said parallel legs.

22. The miniature solenoid valve as set forth in claim 16 in which said fixing pin comprises a bar-like member having a concavely bent portion at substantially the central area of said bar-like member.

23. The miniature solenoid valve as set forth in claim 16 in which said fixing pin has a pair of substantially parallel legs portions each having a concavely bent area in the center of the member and an arm portion connecting between said parallel legs.

* * * * *